United States Patent Office 3,253,895
Patented May 31, 1966

3,253,895
PHOSPHORUS-CONTAINING DEPOSIT-RESISTANT FUEL COMPOSITION
George R. Norman, Lyndhurst, and Casper Dorer, Jr., Cleveland, Ohio, assignors to The Lubrizol Corporation, Wickliffe, Ohio, a corporation of Ohio
No Drawing. Filed Mar. 27, 1962, Ser. No. 182,979
10 Claims. (Cl. 44—76)

This invention relates to fuel oils and in a more particular sense to fuel oils containing an organic, acidic phosphorous-containing additive.

Hydrocarbon fuel oils are susceptible to deterioration in storage upon contact with air, moisture, or heat. The products of deterioration tend to form insoluble sludge-like or varnish-like deposits and cause clogging of filters, orifices, and fuel lines. It is thus desirable to incorporate into a fuel oil chemical additives which are capable of inhibiting deterioration of the oil or dispersing the deterioration products in the oil phase so as to prevent the formation of harmful deposits.

An additional difficulty is encountered in the use of fuel oils obtained by the distillation or cracking of petroleum fractions. Such oils usually contain a small amount of acidic contaminants, such as naphthenic acids, which are formed as by-products of petroleum. They contain also malodorous contaminants such as hydrogen sulfide, mercaptans, and other sulfur-containing substances. To improve the odor, the oils are treated with an alkali or alkaline plumbite solution which removes the objectionable odor of the sulfur-containing contaminants. In this method of purification, the acidic contaminants likewise react with the alkali to form insoluble, soap-like substances. In the operation of a furnace burner or engine the soap-like substances tend to accumulate on the filter screens and near the orifices and eventually cause the clogging of these parts.

Other instances of the formation of the insoluble, soap-like contaminants are found in the transportation of fuel oil by sea-going vessels. It is customary for such vessels, on return trips, to carry a sufficient quantity of sea water as the ballast, in the same compartments which hold the fuel oil on the out-going trips, so as to provide the necessary weight for safe travel on water. Thus, in the next shipment, the fuel oil comes into contact with the residual sea water which has not been completely removed from the vessel. To maintain proper weight distribution, it is sometimes necessary, therefore, also to carry the oil and some sea water in the same tanks. In either situation, the salts in the sea water react with the acidic contaminants of the fuel oil to form the insoluble, soap-like substances.

It is an object of this invention to provide fuel oil additives which are capable of preventing the clogging of the burner or engine parts by the soap-like contaminants present in the fuel oil.

It is an object of this invention to provide novel compositions of matter.

It is also an object of this invention to provide improved fuel oil compositions.

It is also an object of this invention to provide fuel oil compositions having improved dispersant properties.

It is also an object of this invention to provide fuel oil compositions having a reduced tendency to form harmful deposits.

These and other objects are attained in accordance with this invention by providing fuel oil compositions comprising a hydrocarbon fuel oil containing a small amount, effective to reduce the tendency of said fuel oil to form deposits, of an acidic, phosphorus-containing composition prepared by the processs comprising the reaction of phosphorus pentoxide with a hydroxy compound selected from the class consisting of olefin polymer-substituted phenols wherein the olefin polymer substituent has a molecular weight of at least about 250 and the condensation products of said phenols with an epoxide, the molar ratio of said hydroxy compound to said phosphorus pentoxide used being within the range from about 2:1 to 4:1.

The fuel oils suitable for use in a burner or engine include the hydrocarbon oils such as distillate and residual burner oils and diesel fuels having the following characteristics: minimum flash point, 80° F.; maximum pour point, 70° F.; maximum 10% point, 650° F.; maximum 90% point, 900° F.; minimum API gravity, 24; and maximum viscosity at 100° F., 130 SUS (Saybolt Universal seconds). They may be derived from petroleum by a variety of methods including the straight distillation from crude petroleum oil and thermal or catalytic cracking of petroleum oil fractions.

The acidic phosphorus-containing compositions useful as additives in the fuel oil compositions of this invention are prepared by the reaction of a hydroxy compound with phosphorus pentoxide. Phosphoric acid may be used in lieu of the pentoxide. The molar ratio of the hydroxy compound to the phosphorus pentoxide in the reaction should be within the range from about 2:1 to 4:1, the preferred ratio being 3:1. The reactant is effected simply by mixing the two reactants at a temperature between about 50° C. and 90° C. In some instances, the temperature may be 150° C. or higher but ordinarily it is below 100° C. The reaction is preferably carried out in the presence of a solvent which facilitates temperature control and mixing of the reactants. The solvent may be any inert fluent substance in which either one or both reactants are soluble or the product is soluble. It is illustrated by an aryl hydrocarbon such as benzene, toluene, or xylene; an aliphatic hydrocarbon such as n-hexane, cyclohexane, or naphtha; or a polar solvent such as diethyl ether, Carbitol, dibutyl ether, dioxane, chlorobenzene, nitrobenzene, carbon tetrachloride, or chloroform.

The product of the above reaction is acidic. Its chemical constitution is not precisely known. Evidence indicates, however, that it is a mixture of acidic phosphates consisting predominantly of the mono- and the di-esters of phosphoric acid, the ester radical being derived from the hydroxy compound.

An important aspect of the acidic phosphorus-containing composition of this invention is the chemical constitution of the olefin polymer substituent of the hydroxy compound from which it is derived. Thus, the substituent must have a molecular weight of at least about 250. For economic reasons, it preferably has a molecular weight less than about 5000, although substituents having molecular weights as high as 100,000 or even higher likewise are useful.

The sources of the substituent include principally the substantially saturated polymers of mono-olefins having from 2 to about 8 carbon atoms. The especially useful polymers are the polymers of 1-mono-olefins such as ethylene, propene, 1-butene, isobutene, and 1-hexene. Polymers of medial olefins, i.e., olefins in which the olefinic linkage is not at the terminal position, likewise are useful. They are illustrated by 2-butene, 3-pentene, and 4-octene.

Also useful are the interpolymers of the olefins such as those illustrated above with other interpolymerizable olefinic substances such as aromatic olefins, cyclic olefins, and polyolefins. Such interpolymers include, for example, those prepared by polymerizing isobutene with styrene; isobutene with butadiene; propene with isoprene; ethylene with piperylene; isobutene with chloroprene; isobutene with p-methyl styrene; 1-hexene with 1,3-hexadiene; 1-octene with 1-hexene; 1-heptene with 1-pentene, 3-methyl-1-butene with 1-octene; 3,3-dimethyl-1-pentene with 1-hexene; isobutene with styrene and piperylene; etc.

The relative proportions of the mono-olefins to the other monomers in the interpolymers influence the stability and oil-solubility of the final acidic, phosphorus-containing compositions derived from such interpolymers. Thus, for reasons of oil-solubility and stability the interpolymers should be substantially aliphatic and substantially saturated, i.e., they should contain about 80%, preferably at least about 95%, on a weight basis of units derived from the aliphatic mono-olefins and no more than about 5% of olefinic linkages based on the total number of carbon-to-carbon covalent linkages. In most instances, the percentage of olefinic linkages should be less than about 2% of the total number of carbon-to-carbon covalent linkages.

Specific examples of such interpolymers include copolymers of 95% (by weight) of isobutene with 5% of styrene; terpolymer of 98% of isobutene with 1% of piperylene and 1% of chloroprene; terpolymer of 95% of isobutene with 2% of 1-butene and 3% of 1-hexene; terpolymer of 60% of isobutene with 20% of 1-pentene and 20% of 1-octene; copolymer of 80% of 1-hexene and 20% of 1-heptene; terpolymer of 90% if isobutene with 2% of cyclohexene and 8% of propene; and copolymer of 80% of ethylene and 20% of propene.

The olefin polymer-substituted phenols may be the mono- or the poly-substituted phenols, i.e., phenols having two or more olefin polymer substituents. A convenient method for preparing the substituted phenols comprises the alkylation of phenol with the olefin polymer in the presence of a Friedel-Crafts catalyst such as boron fluoride, aluminum chloride, aluminum bromide, ferric chloride, zinc chloride, diatomaceous earth, or the like. In lieu of the olefin polymer, a halogenated olefin polymer may be used to alkylate the phenol. In the latter method the olefin polymer is first, e.g., chlorinated to a product having one or more atomic proportions of chlorine per molecule of the olefin polymer and the chlorinated olefin polymer is then allowed to react with the phenol in the presence of a Friedel-Crafts catalyst. More than one mole of the olefin polymer may be made to react with phenol so that the product may contain two or three olefin polymer substituents. The preparation of the substituted phenols by these and other methods is well-known in the art and need not be described here in greater detail.

As previously indicated the condensation products of the above-described olefin polymer substituted phenols with epoxides likewise are useful to produce the acidic phosphorus-containing compositions of this invention. The epoxides are for the most part alkylene oxides or arylalkylene oxides. The arylalkylene oxides are exemplified by styrene oxide, p-ethylstyrene oxide, alpha-methylstyrene oxide, 3-beta-naphthyl-1,3-butylene oxide, n-dodecylstyrene oxide, and p-chlorostyrene oxide. The alkylene oxides include principally the lower alkylene oxides, i.e., those having 8 or less carbon atoms in the alkylene radical. Examples of such lower alkylene oxides are ethylene oxide, propylene oxide, 1,2-butene oxide, trimethylene oxide, tetramethylene oxide, butadiene mono-epoxide, 1,2-hexene oxide, and 2,3-butene oxide. Higher alkylene oxides are illustrated by 1,2-decene oxide, epoxidized terpolymer of 95 parts (by weight) of isobutene with 3 parts of butadiene and 2 parts of styrene (having a molecular weight of 2000), epoxidized heptadecene, and epoxidized copolymer of 90 parts of isobutene with 10 parts of isoprene having a molecular weight of 5000. The epoxides may contain a polar-substituent, usually a halo radical such as chloro, fluoro, bromo, or iodo; an ether radical such as methoxy, decyloxy, or phenoxy; or an ester radical such as carbomethoxy, or carbobutoxy radical. Examples of such epoxides are epichlorohydrin, butyl 9,10-epoxystearate, epoxidized soybean oil, and epoxidized tung oil.

The methods whereby the condensation products of phenols with epoxides are obtained likewise are known in the art. A commonly used method involves simply mixing a phenol with an epoxide in the presence of a small amount of a basic catalyst under atmospheric or super atmospheric pressures. The basic catalyst may be an alkali or alkaline earth metal hydroxide such as sodium hydroxide or potassium hydroxide; an alkali or alkaline earth metal alcoholate such as sodium ethoxide or barium methoxide; or an alkali or alkaline earth metal phenate such as potassium phenate or calcium octylphenate. It may be the alkali or alkaline earth metal phenate of the olefin polymer-substituted phenol from which the condensation products with an epoxide are derived. In the latter instance the catalyst may be formed in the condensation mixture by adding the elemental metal to the phenol reactant. Only a very small amount of the catalyst is sufficient to cause the condensation of the phenols with the epoxides. It can be as low as 0.01% by weight of the phenol, although in most instances it is within the range from about 0.5% to 2%.

The temperature at which the condensation is carried out may be varied within wide ranges such as from room temperature to 250° C. Ordinarily it is preferably 50°–150° C. More than one mole of the epoxide may condense with the phenol so that the product may contain one or more of the radicals derived from the epoxide. For the purposes of this invention, the condensation products derived from about 3 to about 10 moles of an epoxide per mole of the phenol are especially effective and therefore preferred.

An alternative method for preparing the condensation products involves first converting the phenol to a phenate of an alkali or an alkaline earth metal and mixing the phenate with the desired proportions of the epoxide. This method likewise permits the condensation of more than one mole of the epoxide with the phenol.

The following examples illustrate the methods for preparing the acidic phosphorus-containing additives of this invention.

EXAMPLE 1

A polyisobutene-substituted phenol is prepared by mixing 940 parts (by weight) of phenol and 220 parts of polyisobutene having a molecular weight of 350 at 50°–55° C. in the presence of 30 parts of boron trifluoride, and distilling off the unused phenol and other volatile substances by heating the alkylated phenol to 220° C./12 mm. The resulting alkylated phenol has a hydroxyl content of 3.7%. A mixture of 490 parts of the alkylated phenol, 50 parts of phosphorus pentoxide, and 180 parts of xylene (molar ratio of the phenol to phosphorus pentoxide being 3:1) is prepared at 38°–50° C. and thereafter heated at 80°–85° C. for 4 hours. The resulting mixture is filtered and the filtrate is a xylene solution of the acidic, phosphorus-containing composition having a phosphorus content of 3.1% and an acid number of 76.

EXAMPLE 2

An acidic, phosphorus-containing composition is prepared according to the procedure of Example 1 except that the polyisobutene substituent of the phenol reactant has a molecular weight of 1000.

EXAMPLE 3

An acidic, phosphorus-containing composition is prepared according to the procedure of Example 1 except that the phenol reactant is a di-(polyisobutene)-substituted phenol in which each polyisobutene substituent has a molecular weight of 500.

EXAMPLE 4

An acidic, phosphorus-containing composition is prepared according to the procedure of Example 1 except that 2 moles of the phenol reactant are used for each mole of the phosphorus pentoxide.

EXAMPLE 5

An acidic, phosphorus-containing composition is prepared according to the procedure of Example 1 except that 4 moles of the phenol reactant is used for each mole of the phosphorus pentoxide used.

EXAMPLE 6

An acidic, phosphorus-containing composition is prepared according to the procedure of Example 1 except that the phenol reactant is polyisobutene-substituted naphtol wherein the polyisobutene substituent has a molecular weight of 350.

EXAMPLE 7

An acidic, phosphorus-containing composition is prepared according to the procedure of Example 1 except that the phenol reactant is a polypropene-substituted phenol wherein the polypropene substituent has a molecular weight of 2000.

EXAMPLE 8

An acidic, phosphorus-containing composition is prepared according to the procedure of Example 1 except that the phenol reactant is a mono-substituted phenol in which the substituent is derived from a copolymer of 95 parts of isobutene with 5 parts of styrene having a molecular weight of 1000.

EXAMPLE 9

A condensation product of polyisobutene (molecular weight 350)-substituted phenol and ethylene oxide is obtained by introducing ethylene oxide into the phenol containing 0.13% by weight of sodium hydroxide as the catalyst at 150°–185° C. until the product has a molar ratio of ethylene oxide to phenol of 8.12:1. The product is then blown with nitrogen, dissolved in benzene, and the solution washed with water, dried, and then heated to free the benzene. A mixture of 160 grams (0.21 mole based upon the hydroxyl content of 2.3%) of this product and 9.1 grams (0.064 mole) of phosphorus pentoxide is heated at 50°–60° C. for 3 hours and the resulting product filtered. The filtrate has a phosphorus content of 2% and an acid number of 57.

The acidic, phosphorus-containing compositions are oil-soluble and may be incorporated into a fuel oil simply by mixing them with the oil at the desired concentration. Alternatively, they may be dissolved first in a solvent such as benzene or xylene or in a relatively small amount of the fuel oil to obtain a concentrate and the concentrate may then be diluted with additional quantities of the oil to obtain the final fuel oil composition. The concentration of the acidic, phosphorus-containing compositions in a final fuel oil composition usually ranges from about 0.0001% to 1% by weight. The preferred concentration is about 0.005–0.1%. A higher concentration than 1% may be used but is ordinarily unnecessary.

An important utility of the acidic, phosphorus-containing compositions of this invention is in fuel oils which are contaminated with insoluble, soap-like substances formed between acidic impurities such as naphthenic acids and a metal such as sodium, potassium, magnesium, or calcium. Thus, it has been found that the addition of a small amount of the acidic, phosphorus-containing composition to a fuel oil having such contaminants prevents the clogging of filters, small orifices, and other parts of the burner or engine in which the fuel oil is used.

This effectiveness of the acidic, phosphorus-containing compositions is shown by the following Fuel Oil Anti-Clogging Test. In this test, a filter (1.2 micron porosity) is "clogged" by passing through it a fuel oil containing a small amount of the sodium salt or naphthenic acids (prepared by treating the oil containing 0.025% by weight of naphthenic acids with aqueous sodium hydroxide) and allowing the insoluble sodium salt to accumulate on the filter until the flow rate of the oil is reduced to approximately 2 ml./minute from an initial rate of approximately 8 ml./minute. Thereafter, a fuel oil containing the acidic, phosphorus-containing composition is allowed to pass through the "clogged" filter and its flow rate is recorded. For purposes of comparison, a fuel oil containing no additive is likewise allowed to pass through a similarly "clogged" filter and its flow rate is also recorded. In this particular test (results reported in Table I below), the fuel oil used is kerosene and the flow rates are taken at intervals of 25 ml. of filtrate.

*Table I*

| Milliliters of Filtrate At Which Flow Rate is Reported | Flow Rate (ml./minute) | |
|---|---|---|
| | Fuel Oil Containing 0.01% by Weight of Product of Example 1 | Fuel Oil Containing No Additive |
| (¹) | 1.8 | 1.9 |
| 50 | 7 | 3 |
| 100 | 15 | 3.2 |
| 150 | 16 | 3.2 |
| 200 | 17 | 3.2 |
| 250 | 18 | 3.2 |
| 300 | 19.5 | 3.2 |
| 350 | 20.5 | 3.2 |
| 400 | 21 | 3.2 |
| 450 | 21.5 | |
| 500 | 22 | |
| 550 | 22 | |
| 600 | 22.1 | |
| 650 | 22.2 | |

¹ Initial.

The effectiveness of the additive of this invention to inhibit the tendency of fuel oils to form sludge is shown by the results of the fuel oil Detergent Test (Table II). In this test, a mixture of 4 liters of a catalytically cracked No. 2 light fuel oil and 15 grams of a synthetic sludge (prepared by homogenizing a 50/40/10, by weight, mixture of distilled water/fuel oil/carbon black) is circulated for 2 hours in a fuel oil burner pump (Model J3BC–100–3, manufactured by Sundstrand Machine Tool Company, Illinois), equipped with a 100-mesh Monel strainer. The sludge retained on the strainer is washed with acetone and weighed. The effectiveness of the additive is indicated by the percent reduction of the sludge retained on the strainer as compared to the sludge formed from the fuel oil containing no additive.

*Table II*

| Sample Tested | Sludge Milligrams | Percent Reduction |
|---|---|---|
| Fuel Oil | 603 | |
| Fuel oil + 0.01% by weight of the Product of Example 1 | 8 | 98.6 |
| Fuel oil + 0.01% by weight of the Product of Example 9 | 12 | 98 |

The additive of this invention is effective also to prevent corrosion of metals coming into contact with fuel oils contaminated with water or moisture. In this regard it will be noted that acidic substances present in a fuel oil are usually considered to accelerate corrosion. Thus, the corrosion-inhibiting characteristics of the additive of this invention is unique. This characteristic is associated with the chemical constitution of the olefin polymer substituent of the hydroxy compound from which the additive is derived. The corrosion-inhibiting characteristic is evaluated by the procedure of the MIL–I–25017 Test (modified ASTM D665–54). In this test, a steel spindle is immersed in a mixture of 300 ml. of iso-octane containing the additive and 30 ml. of water and the mixture is agitated by means of a stirrer (1000 r.p.m.) at 100° F. for 20 hours. At the end of the test the spindle is inspected for rust. The result is shown in Table III below.

Table III

| Sample Tested | Rusted Area of the Spindle at End of the Test |
| --- | --- |
| Isooctane | 100% Heavy Rust. |
| Isooctane plus 0.01% by weight of Product of Example 1. | Less then 0.5% Rust |

The corrosion-inhibiting characteristic of the additive of this invention is evaluated also by a Static Corrosion Test in which a piece of metal (½ x 3 x 1/16 inch) is immersed in a mixture of 90 ml. of kerosene and 10 ml. of water in a bottle and the bottle is shaken for 0.5 minute and then allowed to stand at room temperature for 4 weeks. The metal is inspected weekly for rust on the portion immersed in the oil phase and the portion immersed in the aqueous phase. At the end of the test, the loss in weight of the metal piece is measured (the lower the weight loss, the less corrosive the fuel oil). The results of this test are shown in Table IV below.

Table IV

| Sample Tested | Metal Test Piece | Corrosion Results | | | | Weight Loss of Test Piece |
| --- | --- | --- | --- | --- | --- | --- |
| | | 1 week | 2 weeks | 3 weeks | 4 weeks | |
| Kerosene | Steel: | | | | | |
| | Oil phase | Medium | Severe | 9Severe | Severe | 51.1 |
| | Water phase | Severe | do | do | do | |
| | Zinc: | | | | | |
| | Oil phase | None | Slight | Slight | Slight | 7.7 |
| | Water phase | Medium | Severe | Severe | Severe | |
| Kerosene plus 0.01% by weight of Product of Example 1. | Steel: | | | | | |
| | Oil phase | Slight | Slight | Slight | Slight | 9.2 |
| | Water phase | Severe | Severe | Severe | Severe | |
| | Zinc: | | | | | |
| | Oil phase | None | None | None | None | 0.7 |
| | Water phase | do | do | do | do | |

The fuel oil compositions of this invention may contain also other additives such as ashless dispersants, metal-containing detergents, anti-foam agents, color-stabilizers, anti-freeze agents, pour point depressing agents, oxidation-inhibiting agents, corrosion-inhibiting agents, etc. Examples of detergents include barium mahogany sulfonate, barium salt of the phosphorus acid obtained by the reaction of a polyisobutene (molecular weight of 1000) with phosphorus pentasulfide, and calcium salt of didodecylbenzene sulfonate.

Anti-foam agents include polymeric alkyl siloxanes, poly(alkylmethacrylates), and the condensataion product of alkylphenol with formaldehyde and an amine. Pour point depressing agents are illustrated by polymers of ethylene, propylene, or isobutene and poly(alkylmethacrylates). Corrosion- and oxidation-inhibiting agents include zinc di-octylphosphorodithioate, 4 - methyl - 2,6-di-tert-butylphenol, N,N'-sec-butyl phenylenediamine, etc. Still other additives are exemplified by octylamine, monododecyl ether of triethylene glycol, polyisobutene (molecular weight)-substituted succinamide of tetraethylene pentamine, copolymer of di-nonyl fumarate with vinyl acetate, etc.

What is claimed is:

1. A fuel oil composition consisting essentially of a hydrocarbon fuel oil characterized by the presence therein of a small amount of soap-like contaminant having a tendency to form deposits and a small amount, effective to reduce the tendency of said fuel oil to form deposits, of an acidic, phosphorus-containing composition prepared by the process comprising the reaction at a temperature between about 50° C. and 150° C. of phosphorus pentoxide with a hydroxy compound selected from the class consisting of substantially saturated olefin polymer-substituted phenols where the olefin polymer substituent has a molecular weight within the range of from about 250 to about 100,000, and the condensation products of said phenols with from about one to ten moles of an epoxide selected from the class consisting of alkylene epoxides and arylalkylene oxides, the molar ratio of said hydroxy compound to said phosphorus pentoxide used being within the range from about 2:1 to 4:1.

2. The fuel oil composition of claim 1 characterized further in that the acidic, phosphorus-containing composition is prepared by the process comprising the reaction of an olefin polymer-substituted phenol wherein the olefin polymer substituent has a molecular weight from about 350 to about 5000 and is derived from a lower mono-olefin, with phosphorus pentoxide, the molar ratio of said olefin polymer-substituted phenol to said phosphorus pentoxide used being approximately 3:1.

3. The fuel oil composition of claim 1 characterized further in that the acidic, phosphorus-containing composition is present at a concentration within the range from about 0.001% to about 0.5% by weight of the fuel oil.

4. A fuel oil composition consisting essentially of a hydrocarbon fuel oil characterized by the presence therein of a small amount of soap-like contaminant having a tendency to form deposits and from about 0.001% to about 0.5% by weight of said fuel oil of an acidic, phosphorus-containing composition prepared by the process comprising the reaction of a polyisobutene-substituted phenol wherein the polyisobutene substituent has a molecular weight of about 350 with phosphorus pentoxide at a temperature between about 50° C. and about 90° C., the molar ratio of said polyisobutene-substituted phenol to said phosphorus pentoxide used being about 3:1.

5. A fuel oil composition consisting essentially of a hydrocarbon fuel oil characterized by the presence therein of a small amount of soap-like contaminant having a tendency to form deposits and from about 0.001% to about 0.5% by weight of said fuel oil of an acidic, phosphorus-containing composition prepared by the process comprising the reaction at a temperature between about 50° C. and 90° C. of a condensation product of a substantially saturated olefin polymer-substituted phenol with from about one to ten moles of an alkylene oxide wherein the olefin polymer substituent has a molecular weight within the range of from about 250 to about 100,000, with phosphorus pentoxide, the molar ratio of said condensation product to said phosphorus pentoxide being approximately 3:1.

6. In the operation of a hydrocarbon fuel burner assembly equipped with a filter screen through which the fuel passes and in which said fuel is characterized by the presence therein of a small amount of a soap-like contaminant having a tendency to form deposits on said filter screen, the improvement comprising preventing the formation of said deposits which comprises incorporating in the fuel at least about 0.0001% by weight of an acidic, phosphorus-containing composition prepared by the process comprising the reaction at a temperature above about 50° C. of phosphorus pentoxide with a hydroxy compound selected from the class consisting of substantially saturated olefin polymer-substituted phenols wherein the olefin polymer substituent has a molecular weight of at least about 250 and the condensation products of said phenols with at least one mole of an epoxide selected from the class consisting of alkylene epoxides and arylalkylene oxides, the molar ratio of said hydroxy compound to said phosphorus pentoxide used being within the range from about 2:1 to 4:1.

7. The improvement of claim 6 characterized further in that it comprises incorporating in the fuel from about 0.001% to about 0.5% by weight of said fuel of an acidic, phosphorus-containing composition prepared by the process comprising the reaction at a temperature between about 50° C. and 90° C. of phosphorus pentoxide with a substantially saturated olefin polymer-substituted phenol wherein the olefin substituent has a molecular weight from about 350 to about 5000 and is derived from a lower mono-olefin, the molar ratio of said olefin polymer-substituted phenol to said phosphorus pentoxide used being within the range from about 2:1 to 4:1.

8. The improvement of claim 6 characterized further in that it comprises incorporation in the fuel from about 0.001% to about 0.5% by weight of said fuel of an acidic, phosphorus-containing composition prepared by the process comprising the reaction at a temperature between about 50° C. and 90° C. of phosphorus pentoxide with a condensation product of a substantially saturated olefin polymer-substituted phenol with from about 1 to 10 moles of an alkylene oxide wherein the olefin polymer substituent has a molecular weight from about 350 to 5000 and is derived from a lower mono-olefin, the molar ratio of said condensation products to said phosphorus pentoxide being within the range from about 2:1 to 4:1.

9. The improvement of claim 6 characterized further in that it comprises incorporating in the fuel from about 0.001% to about 0.5% by weight of said fuel of an acidic, phosphorus-containing composition prepared by the process comprising the reaction at a temperature between about 50° C. and 90° C. of phosphorus pentoxide with a polyisobutene-substituted phenol wherein the polyisobutene substituent has a molecular weight from about 250 to 5000, the molar ratio of said polyisobutene substituted phenol to said phosphorus pentoxide used being approximately 3:1.

10. The improvement of claim 6 characterized further in that it comprises incorporating in the fuel from about 0.001% to about 0.5% by weight of said fuel of an acidic, phosphorus-containing composition prepared by the process comprising the reaction at a temperature between 50° C. and 90° C. of phosphorus pentoxide with a polyisobutene-substituted phenol wherein the polyisobutene substituent has a molecular weight of about 350, the molar ratio of said polyisobutene-substituted phenol to said phosphorus pentoxide used being about 3:1.

References Cited by the Examiner
UNITED STATES PATENTS

| | | | |
|---|---|---|---|
| 2,698,835 | 1/1955 | Otto | 44—76 |
| 2,745,863 | 5/1956 | Otto | 252—32.5 |
| 2,783,204 | 2/1957 | McDermott | 44—76 |
| 3,004,056 | 10/1961 | Nunn et al. | 44—69 |
| 3,004,057 | 10/1961 | Nunn | 44—69 |
| 3,033,889 | 5/1962 | Chiddix et al. | 44—76 |

DANIEL E. WYMAN, *Primary Examiner.*